Patented July 29, 1952

2,605,300

UNITED STATES PATENT OFFICE 2,605,300

GRAPHITE MOLDING COMPOSITION

Fred A. Shirland, Jr., Parma, Ohio, assignor to Union Carbide and Carbon Corporation, a corporation of New York No Drawing. Application February 23, 1950, Serial No. 145,920

5 Claims. (Cl. 136—121)

This invention relates to a graphite molding composition and has for its particular object a graphite composition having excellent moldability and in the molded condition low electrical resistance and useful strength.

The electrical properties of graphite are of such excellence for many purposes that it has found wide use. Unfortunately because of its physical properties however, graphite is difficult and expensive to fabricate into useful form particularly into intricately shaped articles.

The present invention is a molding composition containing scaly graphite and a suitable binder both in finely divided form which composition is capable of being molded in conventional manner and which, in the molded condition, contains sufficient graphite in a continuous phase to retain to a practical degree the excellent electrical properties of graphite, yet which has sufficient physical strength to make possible its use in many applications where the use of graphite fabricated by machining operations has been impracticable.

The graphite used in the composition of the invention is of a scaly structure, natural flake graphite being preferred. The binder used in the composition of the invention is a petroleum-base microcrystalline wax. Other forms of graphite than natural flake graphite may be used, for instance "kish," which is the graphite precipitated from solidifying iron and switch is available in large quantities in iron and steel producing plants, "skeleton graphite," which is decomposed silicon carbide, and artificial graphite of scaly or flake structure. For the sake of conciseness the invention will be described with particular reference to the use of natural flake graphite.

The proportion of graphite to binder in the composition of the invention is important to the attainment of the desired combination of electrical and physical properties in the molded articles prepared from the composition. Generally speaking the higher the proportion of graphite the better the electrical properties but the poorer the strength of the finished molded article. For most purposes the binder may constitute 10% to 50% by weight of the composition but where low electrical resistance is more important than physical strength it is preferred that the binder constitute 10% to 20% by weight of the composition.

The particle size of the graphite used in the composition of the invention also has an important bearing on the electrical and physical properties of articles molded from the composition. Natural flake graphite is commercially available in particle sizes ranging from about 10 mesh (that is passing through a screen having openings of 1.65 mm.) through 325 mesh (screen openings of .043 mm.) or even smaller. The coarser material generally has the better electrical properties and strength but is very much more expensive than the finer material. For most purposes it is preferred to use a material containing particles of different sizes ranging between 65 mesh and 325 mesh. Thus, at least the major portion of the material should pass a 65 mesh screen and be retained on a 325 mesh screen, at least about 40% passing a 100 mesh screen and being retained on a 200 mesh screen. A typical screen analysis of a satisfactory material is: 10% on 65 mesh; 15% on 100 mesh; 20% on 150 mesh; 25% on 200 mesh; 25% on 325 mesh.

Purity of the graphite is also important from the standpoint of both electrical properties and cost, the lower the ash content, the better the electrical properties but the higher the cost. Graphite containing 50% ash may be used for some purposes but preferably the ash content should not exceed 25%. As is pointed out in Information Circular 7766 of the Bureau of Mines, December 1943, particularly at page 3, natural flake graphites contain impurities of admixed mineral substances in varying proportions, among such substances being mica and various silicates of lime, magnesia, and alumina.

To make possible the production of articles having greater strength than can be obtained utilizing graphite in particle sizes less than 100 mesh and to lower its cost the composition of the invention may be and preferably is diluted with an inert mineral (that is not animal or vegetable) material having a scaly or needle structure such as mica, talc or asbestos fibers or mixtures thereof. When the graphite used contains such materials as mica and the silicates mentioned above as naturally occurring impurities the quantity of diluent added as such may be reduced and the addition of diluent may be entirely omitted.

The intended use of the composition should be borne in mind when selecting a diluent, since the diluent must be inert in the environment in which articles molded from the composition are used. For instance, if the composition is to be used for making positive electrodes for dry cells, the diluent in the composition, if one is used, must be inert to dry cell electrolyte. Of the materials listed mica and talc are preferred because of their low cost and ready availability. Further, the structure of mica is substantially the same as the structure of the natural flake graphite. The particle size and quantity of the diluent should be such as to complement the graphite to provide a graded aggregate. The quantity of diluent used may be as high as three times the quantity of graphite in the composition but preferably the quantity of diluent does not exceed the quantity of graphite. The coarser the graphite particle that is used the less diluent is necessary for strength. Considering electrical conductivity, the coarser the graphite used the greater proportion of diluent that may be used.

The binder used in the composition of the invention as stated above is a petroleum-base microcrystalline wax. Waxes of this type have excellent flexibility, low moisture-transfer rate, and relatively high tensile strength and impart these properties to articles molded from the composition of the invention. Moreover, they are plastic at moderate temperatures and enhance moldability of the composition.

The selection of a particular wax to be used as the binder for the composition of the invention should be made with due consideration for the intended use of articles to be molded from it. For example, although any of the microcrystalline waxes commercially available may be used to make a reasonably satisfactory composition from the molding standpoint, certain waxes cause excessive increase in the electrical resistance of the composition while others do not. It is believed that this difference may be explained by differences in the degree with which the wax wets the graphite. Regardless of the reason, the difficulty of too high resistance may be overcome by increasing the proportion of graphite in a given composition or, preferably, by selecting a wax which does not unduly raise the resistance of the composition. Commercially available waxes which do not cause too much increase in resistance are sold under the following trade designations: Commerce Oil Company's #3717 Micris Brown; H. H. Robertson Company's #SR-2097 microcrystalline wax; Bareco "Be Square" Special Black Wax (M. P. 185° F.).

To prepare the composition of the invention the graphite and the diluent, if one is used, and the wax binder are mixed in any conventional manner. For example, the graphite and diluent may be blended in a suitable container and the binder introduced in the molten condition. When thoroughly mixed the composition is ready for use and may be molded, by injection molding or by extrusion molding, or any other conventional molding method into the desired shape.

A specific example of a molding composition according to the invention is one containing three parts of graphite of a particle size distribution as above given, three parts ground talc as a diluent and one part microcrystalline wax, all being parts by weight.

The molding composition of the invention is capable of many uses. A particular use for which it is excellently suited is the molding of positive electrodes for dry cells. For example, it may be used to produce either the conventional positive electrode of conventional dry cells or the external positive electrode for dry cells of the general construction shown in U. S. Patent 1,266,166. It is particularly well suited to use in the manufacture of the dry cell described and claimed in the application Serial No. 145,721 of J. P. Teas filed February 23, 1950, by reason of the fact that the molded article possesses high electrical conductivity combined with adequate strength and resistance to the passage of liquid through it and because it, the molded article, is sufficiently permeable to gas to permit venting of internally generated gas from such a cell.

I claim:

1. A positive electrode for a dry cell, said electrode being molded from a composition containing as essential constituents natural flake graphite and petroleum-base microcrystalline wax, said wax serving as a binder and being present in a proportion of 10% to 50% of said composition by weight, the remainder being natural flake graphite and finely-divided talc, said talc being present in a proportion up to three times said graphite, at least 40% of said graphite having a particle size of 65 mesh to 325 mesh.

2. A positive electrode for a dry cell, said electrode being molded from a composition containing as essential constituents natural flake graphite and petroleum-base microcrystalline wax, said wax serving as a binder and being present in a proportion of 10% to 20% of said composition by weight, the remainder being natural flake graphite and ground talc, the proportion of talc to graphite being as high as 1:1, at least 40% of said graphite having a particle size of 100 mesh to 200 mesh.

3. A positive electrode for a dry cell, said electrode being molded from a composition containing as essential constituents natural flake graphite and petroleum-base microcrystalline wax, said wax serving as a binder and being present in a proportion of 10% to 20% of said composition by weight, the remainder being natural flake graphite and an inert mineral diluent selected from the group consisting of mica and talc, said diluent being present in a proportion up to 100% of said graphite, at least the major portion of said graphite having a particle size of 65 mesh to 325 mesh.

4. A positive electrode for a dry cell, said electrode being molded from a composition containing as essential constituents natural flake graphite and petroleum-base microcrystalline wax, said wax serving as a binder and being present in a proportion of 10% to 50% of said composition by weight, the remainder being natural flake graphite and finely-divided mica, said mica being present in a proportion up to three times said graphite, at least 40% of said graphite having a particle size of 65 mesh to 325 mesh.

5. A positive electrode for a dry cell, said electrode being molded from a composition containing as essential constituents natural flake graphite and petroleum-base microcrystalline wax, said wax serving as a binder and being present in a proportion of 10% to 20% of said composition by weight, the remainder being natural flake graphite and finely-divided mica, said mica being present in a proportion up to three times said graphite, at least 40% of said graphite having a particle size of 100 mesh to 200 mesh.

FRED A. SHIRLAND, Jr.

REFERENCES CITED

The following references are of record in the file of this patent:

UNITED STATES PATENTS

| Number | Name | Date |
| --- | --- | --- |
| 1,081,277 | Auringer | Dec. 9, 1913 |
| 1,293,107 | Johnson | Feb. 4, 1919 |
| 1,737,130 | Storey et al. | Nov. 26, 1929 |
| 1,899,064 | Storey et al. | Feb. 28, 1933 |
| 2,088,233 | Colloseus | July 27, 1937 |
| 2,387,529 | Pearsall | Oct. 23, 1945 |
| 2,496,709 | Gelardin | Feb. 7, 1950 |

FOREIGN PATENTS

| Number | Country | Date |
| --- | --- | --- |
| 2,347 | Great Britain | of 1904 |
| 533,512 | Great Britain | Feb. 14, 1941 |